United States Patent
Seshadri et al.

(10) Patent No.: US 10,684,961 B1
(45) Date of Patent: Jun. 16, 2020

(54) EXTERNAL MEMORY PROTECTION FOR CONTENT ADDRESSABLE MEMORY

(71) Applicant: Amazon Technologies, Inc., Seattle, WA (US)

(72) Inventors: Kiran Kalkunte Seshadri, Cedar Park, TX (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 14/873,867

(22) Filed: Oct. 2, 2015

(51) Int. Cl.
*G11C 29/52* (2006.01)
*G06F 12/14* (2006.01)
*G06F 12/0864* (2016.01)

(52) U.S. Cl.
CPC ...... *G06F 12/1458* (2013.01); *G06F 12/0864* (2013.01); *G06F 2212/1052* (2013.01); *G06F 2212/251* (2013.01)

(58) Field of Classification Search
CPC .................... G06F 12/1458; G06F 12/0864
See application file for complete search history.

(56) References Cited

U.S. PATENT DOCUMENTS

| | | | | |
|---|---|---|---|---|
| 7,254,748 B1* | 8/2007 | Wright | ................ | G06F 11/1064 711/108 |
| 7,290,083 B2 | 10/2007 | Shoham et al. | | |
| 7,304,873 B1* | 12/2007 | Gupta | ................ | G06F 11/1068 365/189.07 |
| 7,345,897 B2 | 3/2008 | Krishnan et al. | | |
| 7,366,829 B1* | 4/2008 | Luttrell | ................ | G06F 11/1064 711/108 |
| 7,594,158 B2 | 9/2009 | Wickeraad | | |
| 7,689,889 B2 | 3/2010 | Cohen | | |
| 7,757,152 B2 | 7/2010 | Wickeraad et al. | | |
| 8,887,026 B2 | 11/2014 | Bremler-Barr et al. | | |
| 2004/0015753 A1* | 1/2004 | Patella | ................ | G06F 11/1064 714/718 |
| 2005/0289195 A1* | 12/2005 | Lehtola | ................ | H04L 67/125 |
| 2006/0081971 A1* | 4/2006 | Shau | ................ | G01R 31/2856 257/690 |
| 2012/0110411 A1* | 5/2012 | Cheung | ................ | G06F 11/106 714/758 |

(Continued)

OTHER PUBLICATIONS

"Cost Effective Protection Techniques for TCAM Memory Arrays," I. Sideris, K. Pekmestzi, in IEEE Transactions on Computers vol. 61, No. 12, Dec. 2012, pp. 1778-1788.

(Continued)

*Primary Examiner* — Ryan Bertram
*Assistant Examiner* — Trang K Ta
(74) *Attorney, Agent, or Firm* — Robert C. Kowert; Kowert, Hood, Munyon, Rankin & Goetzel, P.C.

(57) ABSTRACT

External memory protection may be implemented for content addressable memory (CAM). Memory protection data, such as duplicate values for entries in a CAM or error detection codes generated from values of the entries in a CAM, may be stored in a random access memory that is separate from the CAM. When an entry in the CAM is accessed to perform a lookup or scrubbing operation, the memory protection data may be obtained from the RAM. A validation of the value of the entry may then be performed according to the memory protection data to determine whether the value is valid.

20 Claims, 15 Drawing Sheets

(56) References Cited

U.S. PATENT DOCUMENTS

| | | | |
|---|---|---|---|
| 2014/0115423 A1* | 4/2014 | Cooke | H03M 13/15 |
| | | | 714/763 |
| 2015/0070957 A1* | 3/2015 | Otsuka | G11C 8/12 |
| | | | 365/49.17 |
| 2015/0095738 A1* | 4/2015 | Zampaglione | H03M 13/13 |
| | | | 714/758 |
| 2015/0106677 A1 | 4/2015 | Greenfield et al. | |
| 2016/0134536 A1* | 5/2016 | Wang | H04L 45/7457 |
| | | | 370/392 |

OTHER PUBLICATIONS

U.S. Appl. No. 14/857,787, filed Sep. 17, 2015, Kiran Kalkunte Seshadri.

* cited by examiner

EXTERNAL MEMORY PROTECTION FOR CONTENT ADDRESSABLE MEMORY

BACKGROUND

Error detection and correction techniques ensure that data stored in memory devices is reliable for performing operations based on the stored data. Error detection may be performed when a location in a memory device is accessed (e.g., read from) in order to ensure that errors may be caught prior to performing an action based on the data in the location. Error detection techniques are not without cost. Some forms of error detection techniques may increase the latency or time spent accessing the memory device. Error detection techniques may also consume portions of chip area or power that would be otherwise used to implement other tasks.

Figure 1:
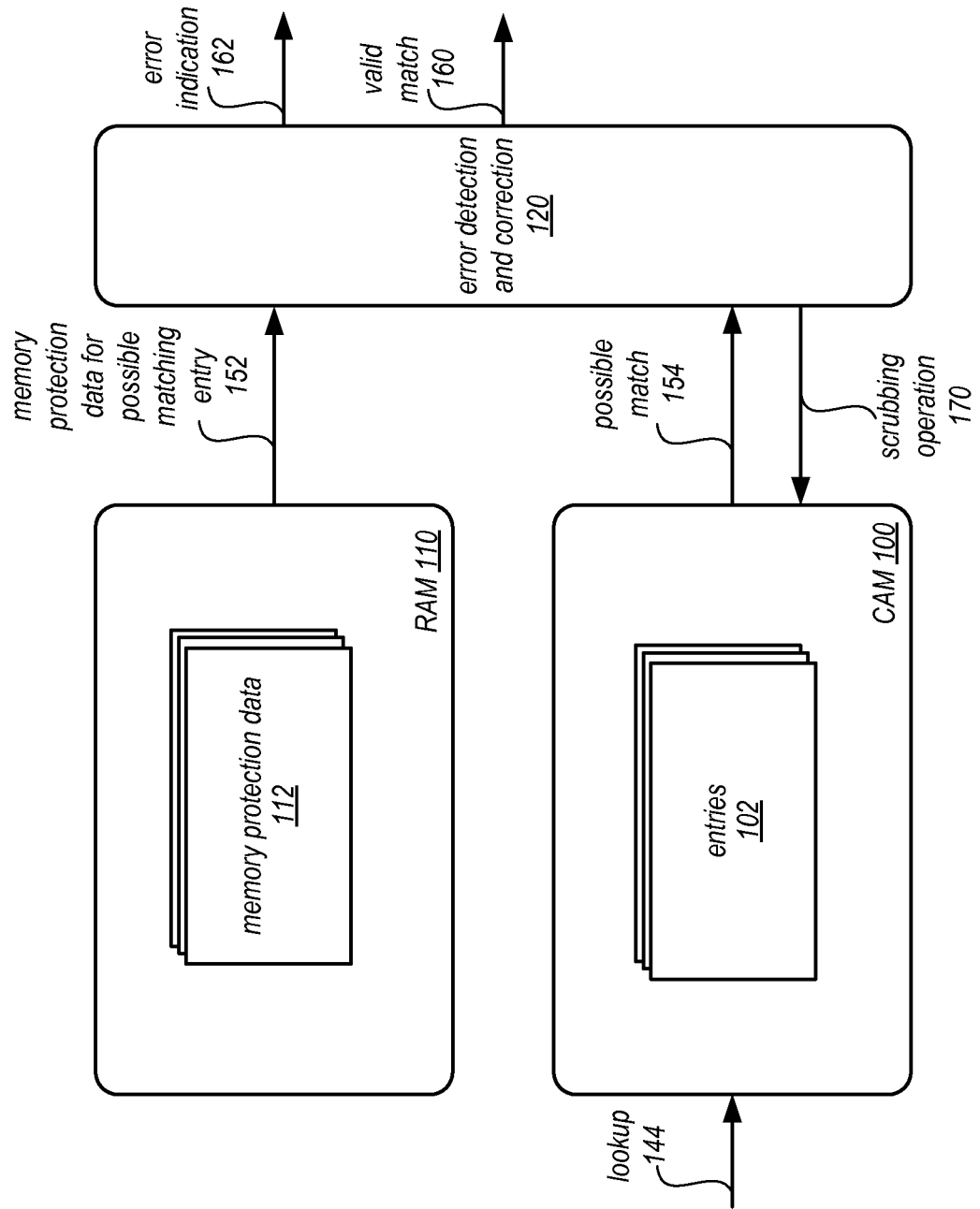
FIG. 1 illustrates a logical block diagram of external memory protection for content addressable memory (CAM), according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware~for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement external memory protection for content addressable memory (referred to herein as "CAM"). CAM is associative storage that compares input data with values of entries in the storage to identify a matching entry. Matching entries may then be used to return data corresponding to the matching entry (e.g., a lookup value). Individual bit values of input data, such as a data word (or other lookup key), may be compared to the bits of the entries when identifying a match. Different types of CAMs may be implemented in various integrated circuit designs. Binary CAMs for instance provide entries that perform lookups to identify an exact match of a provided lookup key. Ternary CAMs introduce a don't-care state for a bit value of the value for an entry, in addition to the 1 or 0 possible bit values. In this way, a single entry in a TCAM can be a match for multiple lookup keys.

In order to implement the additional don't-care state, additional bit values may be stored for an entry of a TCAM.

For example, an entry of TCAM 100 may store a data bit and mask bit for each memory cell. A memory cell may store the value of individual bits of the value of an entry in a TCAM, which is used to match lookup keys. Generally, bits may have a value of 1 or 0. Thus, a mask bit and a data bit may have a value of 1 or 0. For a TCAM, the values of the mask bit and data bit together indicate the state or logic indicated by a memory cell for an individual bit. For instance, if the mask bit is 0 and the data bit is 1, then the data value is 1. Conversely, if the mask bit is 1 and the data bit is 0, then the data value is 0. If both the mask bit and the data bit are 0, then a don't-care condition for the memory cell may be indicated. Thus, when determining whether a particular bit of a lookup key matches the corresponding bit of the entry value indicated by the memory cell in the entry, a don't-care state indicates that either value of the particular bit of the lookup key, 1 or 0, is considered a match for the corresponding bit of the entry value. An illegal state occurs when mask and data bits both store values of 1, which indicates that an error exists in the memory cell.

An entry 110 for TCAM 100, may also implement a parity bit. A parity bit may be determined from the data bit values of each memory cell 112 in an entry 110. For example, the parity bit may be determined based on the number of times a value, 1 or 0, is stored in the data bits. Consider a parity bit that is determined from the number of times 1 is stored in data bits for memory cells 112a-112n. If the number of 1s is even, then the parity bit may be set to a 1 value. However, if the number of 1s is odd, then the parity bit may be set to a 0 value. In at least some embodiments, an entry 110 for TCAM 100 may include a valid bit. The valid bit may be set, storing a value of 1, to indicate that the entry is valid for performing lookups. If, however, the valid bit is not set, storing a value of 0, then the valid bit indicates that the entry should not be considered for matching with a lookup key.

TCAMs and other types of CAMs may store a large number of entries. The correspondingly large numbers of bits stored for these entries are susceptible to error conditions. Bit errors or bit flips may occur, changing the original value of a bit to the other value, from a value of 0 to 1, or from a value of 1 to 0. Such errors (sometimes referred to as soft errors) may occur when radioactive decay (e.g., alpha particles or neutrons from materials implementing the hardware of the CAM (e.g., an integrated circuit implementing a CAM)) changes the electrical charge of bits stored in the CAM. As CAMs increase in size, the density of stored bits may result in a greater susceptibility to bit errors.

Different memory protection techniques have been developed for CAMs to correct, or at least detect, bit errors that may exist in entries. In this way, erroneous lookup operations may be prevented or recognized due to bit errors. In order to provide memory protection for entries in a CAM, additional information, such as parity bits, error correction codes, and other information describing an entry may be stored so that the values of entries may be validated when accessed. However, the overhead to store such data in a CAM increases the costs of the CAM. Moreover, additional validation operations may introduce latency into the performance of lookup operations. In various embodiments, external memory protection for CAM may be implemented so that memory protection techniques may be implemented without increased cost to implement the CAM or added latency to perform lookup operations. For instance, lookups to the CAM may be performed and memory protection data accessed in in pipelined fashion (unlike typical implementations which store memory protection data in the CAM requiring an additional cycle to access the memory protection data).

FIG. 1 illustrates a logical block diagram of external memory protection for content addressable memory (CAM), according to some embodiments. CAM 100 may be one of the different types of CAMs noted above (e.g., a binary CAM or TCAM). As illustrated in FIG. 1, CAM 100 implements different entries 102 to store values for performing lookup operations. A random access memory (RAM) 110 may also be implemented to store memory protection data 112 that corresponds to the values stored in the entries 102. Moreover, error detection and correction mechanisms for the RAM 110 (not illustrated) may also be implemented to ensure that memory protection data is valid for performing validations with respect to CAM 100.

Memory protection data 112 may include one or multiple kinds of information to perform various memory protection techniques. For instance, memory protection data may include an error detection code, such as a parity bit or an error correction code that is generated based on the data of a value stored in an entry (e.g., data bits, mask bits, and valid bit). Erroneous entries may be identified and corrected (if the error detection code is also an error correction code). Memory protection data may also include a duplicate value of the value stored in entries 102. Duplicate values may be utilized to prevent false hits from occurring when lookups are performed at a CAM. By comparing the lookup key with a duplicate value of the entry, a false hit is detected because a duplicate value would not match the lookup key (even though an erroneous entry value in the CAM indicated a match with the lookup key). A comparison may be performed in different ways depending on the implementation of the CAM. In a TCAM, for instance, the comparison may be a bitwise comparison between the lookup key with the data bits and mask bits of the entry. Preventing false hits is very beneficial in many different contexts implementing a CAM, such as networking contexts like the packet processor described below in FIG. 2. In such a scenario, a false hit could lead to a network packet being wrongly directed and ultimately lost.

Different error detection and correction techniques 120 utilize memory protection data 112 to provide memory protection without performing additional accesses to CAM 100. For example, when a lookup 144 is received and a possible matching entry identified 154, an error detection technique may access memory protection data stored for the possible matching entry 152 to perform an error detection technique. For example, an error detection code may be obtained which can be decoded with respect to the value of the possible matching entry 154 in order to determine whether or not a bit error exists in the value. If no bit error exists, then the possible match 154 may be identified as a valid match. However, if a bit error exists, then an error indication 162 may be provided which indicates that the possible match 154 is a false hit. Various error handling controls may be implemented to respond to detected errors.

Error detection techniques may also be implemented when performing scrubbing operations, such as scrubbing operation 170, in some embodiments. A scrubbing operation 170 may be performed with respect to different entries 102 periodically in order to detect bit errors in the entries. The values of entries 102 may be corrected, if erroneous. In this way, error scenarios such as false misses (where a valid match is not found because the lookup key does not match an erroneous value in the entry) may also be detected and prevented.

Many different configurations of components may be implemented to provide external memory protection for CAM, such as discussed below with regard to FIGS. 5A-9B. Therefore, please note that the previous descriptions are not intended to be limiting, but are merely provided as a logical example of external memory protection for a CAM.

This specification begins with a general description of a networking device, which may implement a CAM, such as a TCAM, as part of packet processing. Then various examples of a packet processor are discussed, including different components/modules, or arrangements of components/modules that may be implemented and which may perform external memory protection for entries in a CAM. A number of different methods and techniques to implement external memory protection for a CAM are then discussed, some of which are illustrated in accompanying flowcharts. Various examples are provided throughout the specification.

Figure 2:
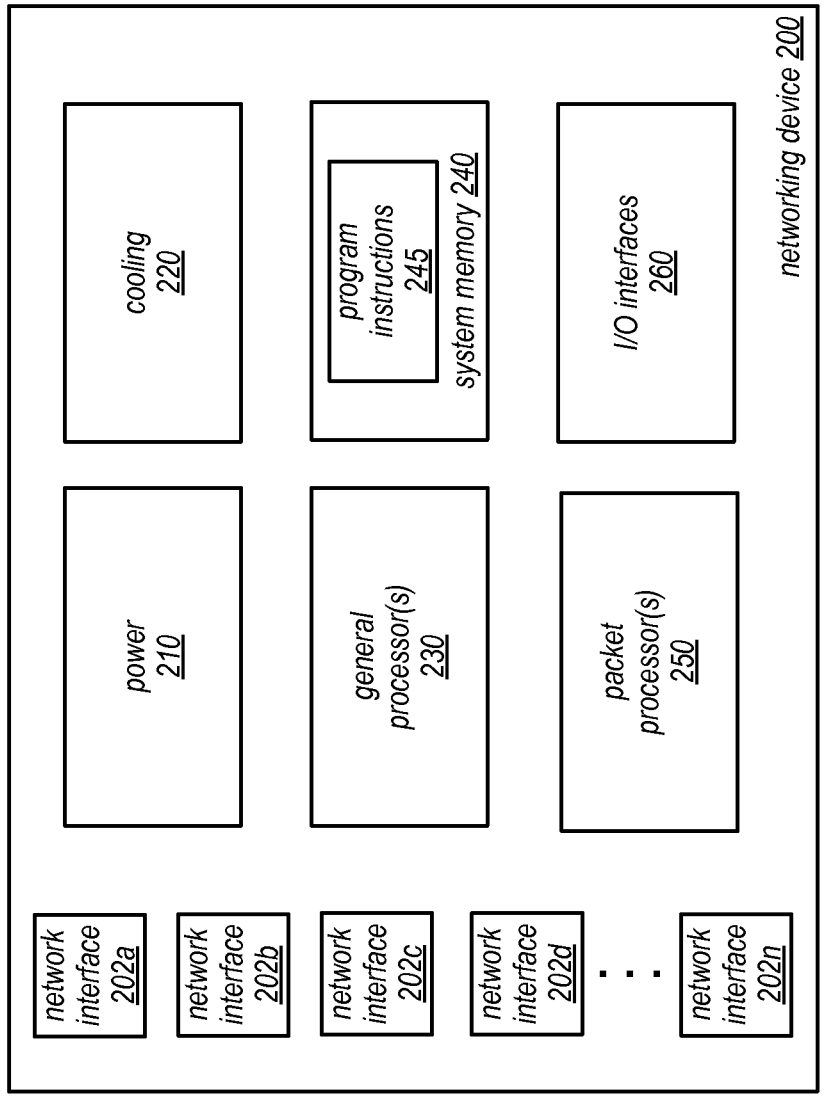
FIG. 2 is a logical block diagram illustrating a networking device that implements a packet processor, according to some embodiments.

FIG. 2 is a logical block diagram illustrating a networking device that implements a packet processor, according to some embodiments. Networking device 200 may be a networking device configured to route, forward, or otherwise facilitate the communication of different devices, systems or networks via network connections to the networking device. A networking device may provide electrical and logical network connections. Networking devices may operate utilizing data included in different OSI layers, such as layers 2 and 3 to make forwarding determinations (e.g., to send a network packet received from one source connected to the switch to another source connected to the switch). Please note that networking devices, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of networking device 200.

Networking device 200 may include general processor(s) 230 which may include multiple cores, and which may be single or multi-threaded) coupled to a system memory 240 via an input/output (I/O) interface 260. Networking device 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement various management functions and interfaces for networking device 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to perform various switch management operations). In one embodiment, I/O interfaces 260 may be configured to coordinate I/O traffic between processor 230, system memory 245 and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

Figure 3:
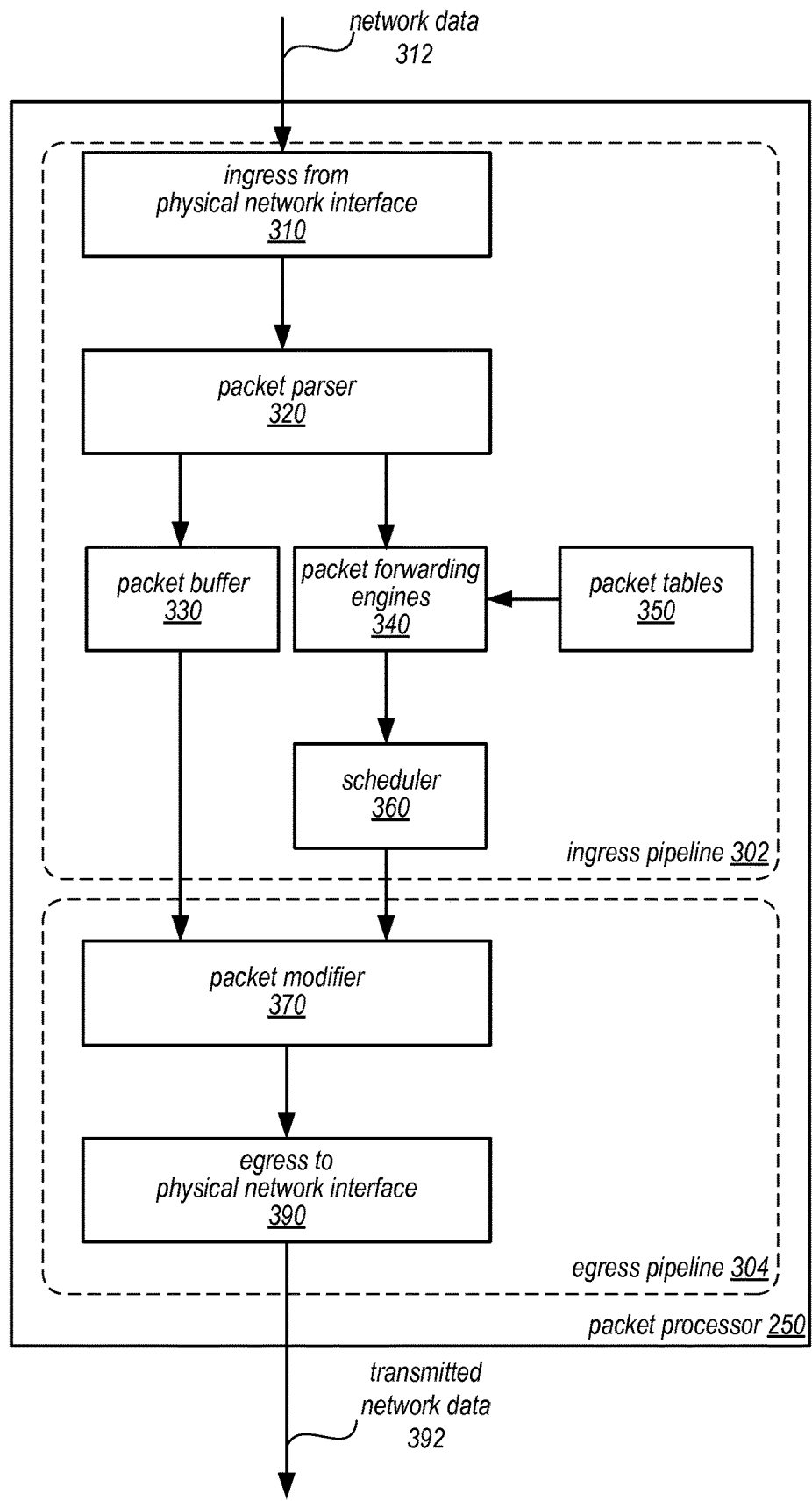
FIG. 3 is a logical block diagram illustrating a packet processor that implements a CAM, according to some embodiments.

As noted in FIG. 2, one or more multiple packet processors 250 may be implemented to process data received via network interface(s) 202 at networking device 200. Packet processor(s) 250 may be implemented as dedicated hardware to perform various stages of packet processing for networking device 200. For example, packet processor(s) 250 may be implemented as an application specific integrated circuit (ASIC), field programmable gate array (FPGA), or other dedicated circuitry that performs packet processing. Packet processor(s) 250 may be assigned to one or multiple network interface(s) 202, performing dedicated processing of network data received via the assigned network interface(s) 202. FIG. 3 is a logical block diagram illustrating a packet processor that implements a CAM, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350. Ingress pipeline 302 may also access packet tables 350 and other packet routing information. Egress pipeline 304 may include a packet modifier 370 with access to other packet modification data, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different layer headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340.

Packet forwarding engines 340 may access data stored in packet tables 350 to make forwarding and tunneling decisions for the network packet based on information in the packet header (e.g., packet metadata) extracted by packet parser 320. For example, packet forwarding engines 340 may perform lookups for data in layer 2 (L2) portions of the packet to perform L2 forwarding. L2 forwarding may access a MAC address table in packet tables 350 perform two lookups (which may be in parallel). The first lookup may be performed with a key extracted from the packet header at packet parser 320 (e.g., a VLAN and source MAC address), to determine whether an entry for the packet is present in the MAC address table. If the source MAC address is unknown, then a mapping determination may be made to map the source MAC address to a port identified in the packet header. If the MAC address is known but attached to a different port than indicated in the MAC address table, then an operation may be performed to move the source MAC address to the port identified in the packet header. Otherwise the MAC address is known in the MAC address table. Another lookup to the MAC address table may also be performed with another key (e.g., the VLAN and the destination MAC address). The network packet may be routed if the MAC address table contains an entry for the destination MAC address owned by the networking device 200 (otherwise other operations may be performed, such as trapping the network packet for the CPU, bridging the packet out of a listed interface, or flooded out of all ports in an STP forwarding state).

Similarly, packet forwarding engines 340 may also perform lookups for data in layer 3 (L3) portions of the packet to perform L3 forwarding, in some embodiments. For example, internet protocol (IP) headers for the packet may be evaluated with respect to entries in tables, such as a routing table, to determine forwarding to be performed. Packet forwarding engines 340 may also determine whether tunneling is enabled for the packet. For instance, a tunnel start table may be accessed which indicates whether a tunnel header is to be inserted into the packet. As packet forwarding engines 340 make forwarding decisions about the packet (e.g., for L2, L3 and/or tunneling), the decisions are maintained as packet metadata. The packet metadata may be provided to scheduler 360 for scheduling determinations.

As discussed above, packet tables 350 may be implemented in one or multiple storage devices, such as various memory devices (e.g., a CAM, such as a TCAM, and/or random access memory) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

Scheduler 360 may control the buffering of packets and scheduling of operations within packet processor 250. For example, scheduler 360 may implement a memory management unit to allocate available memory segments in packet buffer 330 to store packets to be buffered. If a packet needs to be buffered (e.g., because the egress interface is congested), scheduler 360 may store the packet in a private pool of memory assigned to a particular physical interface port for the packet or shared pools of memory to store packets (e.g., if the private pool of memory is full). Scheduler 360 may also implement a memory management unit to dequeue packets from packet buffer 330 for final processing and egress. Scheduler 360 may provide the appropriate metadata for a packet to modifier 360.

Network packets that have passed through ingress pipeline 302 may be scheduled or released from packet buffer 330 for modification, reassembly and egress as part of egress pipeline 304. Packet modifier 370 may be implemented to modify packet headers based on the routing decisions made at the packet metadata determine by packet forwarding engines 340. For example, if tunneling is enabled for a packet, packet modifier 370 may create and insert the appropriate tunnel header in order to encapsulate at least a portion of the packet to implement a tunneling protocol. Packet modifier 370 may also perform modifications to other data in the packet header. Once the modified packet has been reassembled, egress unit to physical network interface 290 may utilize the physical layer (PHY) interface and the Ethernet Media Access Control (MAC) layer interface to transmit network packets as network data 392 via the appropriate physical connection (e.g., coaxial, twisted pair, or optical cable).

Figure 4:
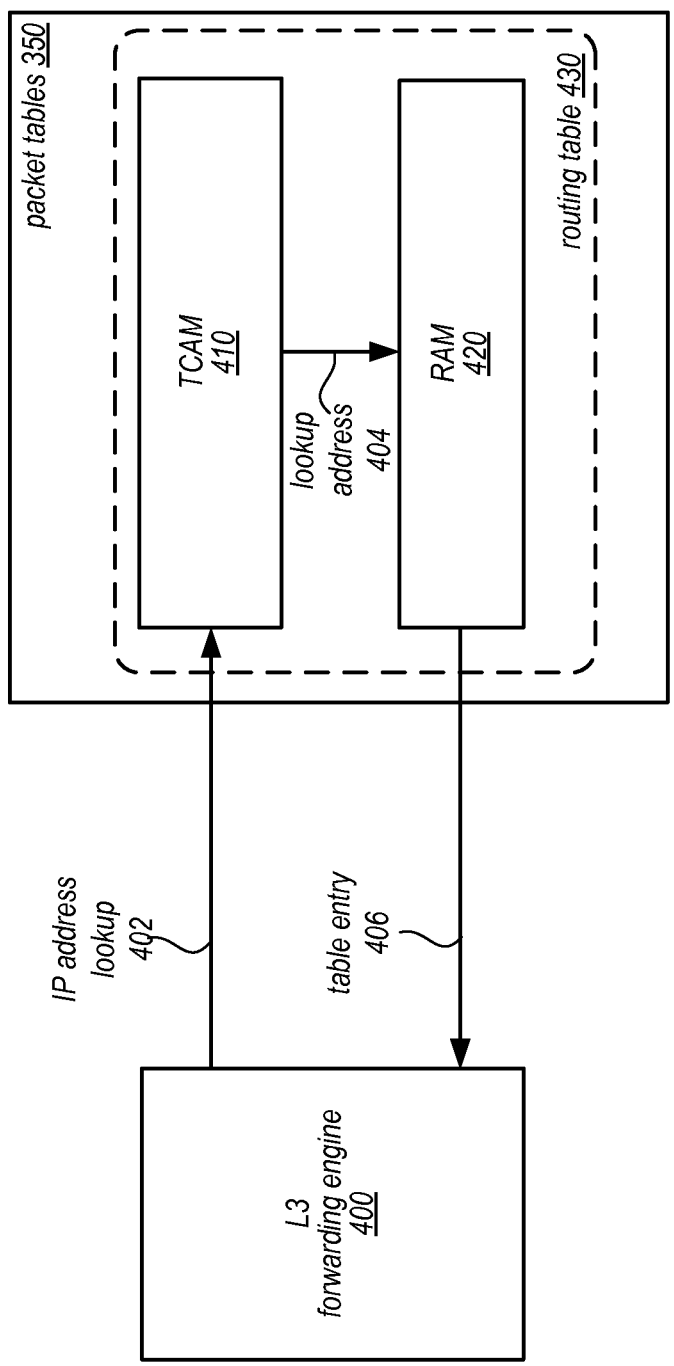
FIG. 4 is a logical block diagram illustrating a ternary CAM implemented for storing packet tables for a packet processor, according to some embodiments.

As noted above, packet tables 350 may store data to make forwarding decisions for network packets. Lookups may be performed to packet tables 350 to retrieve information appropriate to a network packet. In various embodiments, TCAM(s) may be implemented to provide data appropriate to a network packet. FIG. 4 is a logical block diagram illustrating a TCAM implemented for storing packet tables for a packet processor, according to some embodiments. A forwarding engine, such L3 forwarding engine 400 (which may be one of multiple packet forwarding engine(s) 340), may make forwarding decisions based on information obtained from an L3 header in a network packet, such as an IP header. Routing table 430 may be implemented as part of packet tables 350 to store routing information according to IP address. For example, a routing table may indicate a next hop IP address for the IP address of the network packet being processed.

To access the appropriate information specific to an IP address for a network packet, L3 forwarding engine 400 may perform a lookup 402 using the IP address of a network packet as a lookup key to TCAM 410. TCAM 410 may store entries with values that correspond to IP addresses utilized as lookup keys. When IP lookup 402 is received, TCAM 410 may compare the IP address with each entry in TCAM 410. If an entry matches, TCAM 410 may validate that the value in the entry is a valid match with respect to memory protection data stored in RAM 420 or another RAM for the value in the entry, according to the various techniques discussed below with regard to FIGS. 5A-11. In some embodiments, multiple entries may match, and therefore a selection ordering of matches may be implemented (e.g., according to the ordering of matching entries in the table, where a higher entry is selected as the matching entry above a lower matching entry). A corresponding lookup return value may be generated or identified based on a valid match entry. For instance, in FIG. 4, the lookup return value may be an address to a location in a random access memory 420 that stores the appropriate data for the IP address (e.g., the IP address of the next hop for the network packet). TCAM 410 (or another component) may direct the access at the lookup address 404 in RAM 420 in order to provide the data store in the address to L3 forwarding engine 400 as the table entry 406 in routing table 430 for the IP address.

Lookup operations, such as those discussed above with regard to FIG. 4 are just some of the scenarios in which memory protection data may be implemented to ensure that erroneous results are not returned by systems that utilize CAMs to search for particular data. Different combinations of operations that trigger error detection, such as scrubbing and post-lookup operations, storage arrangements for memory protection data, and/or different types of memory protection data generated and maintained may result in the detection and/or correction of different bit errors. Different implementations may optimize for different goals, such as storage overhead for memory protection data, power, space on chip, complexity, capable of multi-stage lookup operations, or any other implementation or performance cost.

Figure 5A:
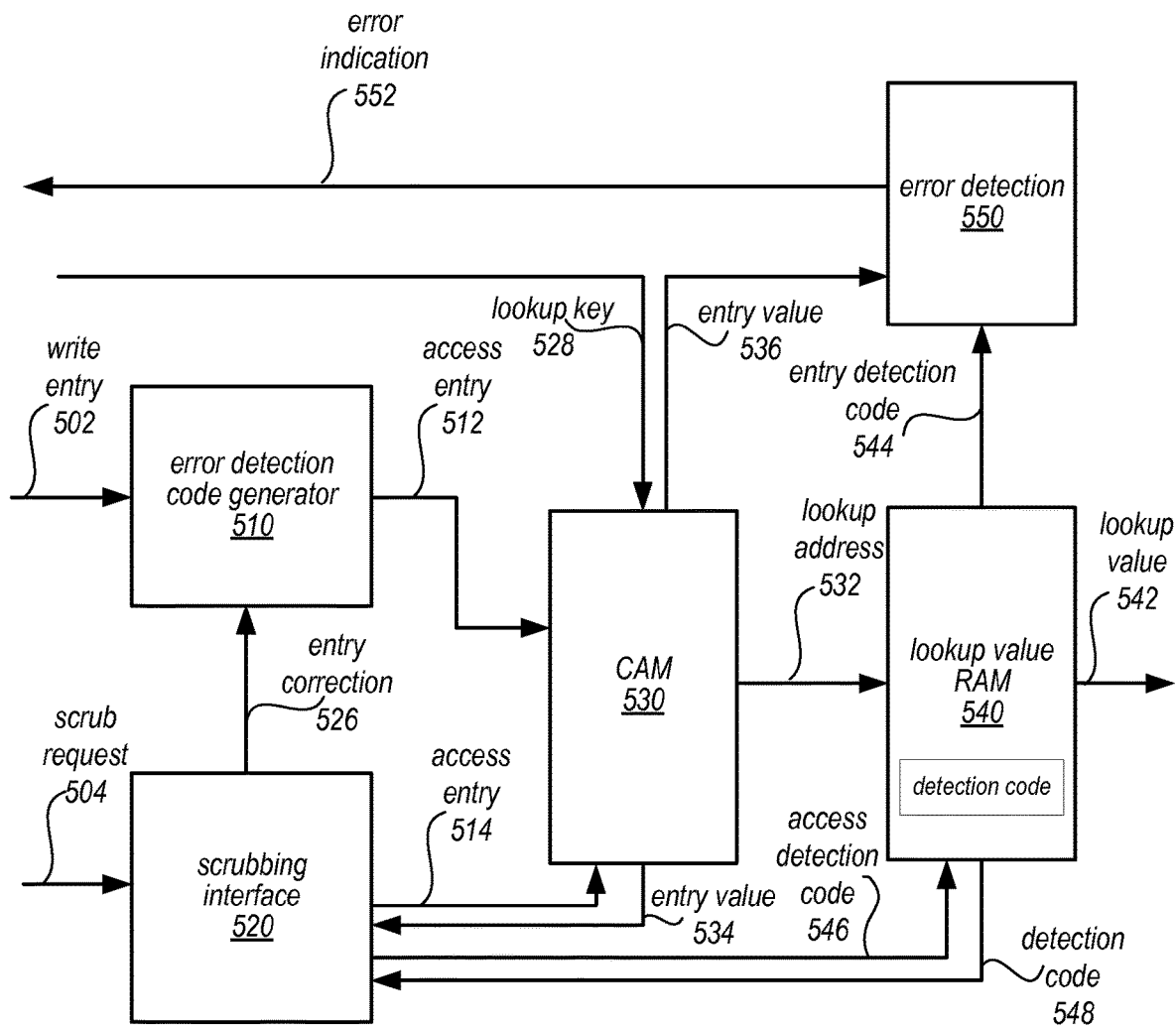
FIGS. 5A-9B are logical block diagrams illustrating different examples and combinations of error detection and correction components that access memory protection data stored external to CAM to provide memory protection, according to some embodiments.

FIG. 5A is a logical block diagram of memory protection that utilizes memory protection data stored external to a CAM. In FIG. 5A, a write to an entry 502 may trigger the generation of an error detection code by error detection code generator 510. Error detection code generator 510 receive as input data bits which may be directly used as input or evaluated, manipulated, modified, or used to derive other data bits which may be used to generate an error detection code (e.g., according to the various techniques to generate error detection codes discussed below, such as parity bits and error correction codes). Error detection code generator 510 may then store 512 the value into the entry in CAM 530 and the generated error detection code in lookup value RAM 540. Lookup value RAM 540 may be implemented as one of different types of RAM, such as static RAM or dynamic RAM, and store the lookup values corresponding to entries in CAM 530.

In FIG. 5A, two types of operations may trigger validation of an entry stored in CAM 530. Scrubbing interface 520, for instance, may receive a scrub request 504 for an entry in CAM 530. Scrubbing interface 520 may access the entry 514 in CAM 530. In return scrubbing interface 520 may receive the entry value 534. Scrubbing interface 520 may also access 546 lookup value RAM 540 to obtain the error detection code 548. Scrubbing interface 520 may utilize the error detection code to determine whether the entry value obtained at 534 is valid. For example, if the error detection code is a parity bit, then scrubbing interface 520 may perform a parity check utilizing the parity bit to determine whether a bit error exists. If the error detection code is an error correction code, then scrubbing interface 520 may decode the error correction code with respect to the entry value to generate a syndrome code, which may indicate whether bit errors exist in the value of the entry. In some embodiments, scrubbing interface 520 may generate an entry correction 526 to be passed to error detection code generator which may utilize the entry correction code to rewrite the entry with the corrected data (and may include generating an update error detection code). In some embodiments, scrubbing interface 520 may access a backup copy of the entry to provide the entry correction 526. Scrub request 504 may be received during processing cycles when CAM 530 is idle according to determined or random times.

The other operation that may trigger the validation of an entry in CAM 530 is a lookup operation. For example, a lookup key 528 may be received to perform a lookup operation. A matching entry in CAM 530 may be identified and a corresponding lookup address 532 utilized to read and provide the lookup value 542 stored in lookup value RAM.

The detection code may also be obtained and provided 544 to error detection 550. Error detection component 550 may be implemented to perform error detection based on the error detection code for the entry with respect to the current entry value 536. Similar to scrubbing interface 520, error detection component may utilize the error detection code 544 to determine whether bit error(s) exist in the value of the entry in CAM 530. If an error is detected, then an error indication 552 may be provided. Control software, such as firmware, an operating system, or other software controller may handle the error (e.g., by determining and providing a corrected entry to write 502 to CAM 530). Error indication 552 may also be provided so that further processing may be halted, restarted, or otherwise adapted instead of utilizing an erroneous result provided by CAM 530. For example, a network packet being processed by packet processor 250 (as discussed above in FIG. 3) may drop or halt processing on the network packet at whatever stage implementing the CAM returned the erroneous result.

FIG. 5A illustrates an example embodiment that may be cost efficient as memory protection data is not stored in CAM 530. Certain types of error detection codes (e.g., error detection codes generated from bits derived from bits stored in an entry, such as bits that indicate the presence of don't care states in TCAM memory cells) may also be utilized to further reduce the amount of space needed to store memory protection data.

Figure 5B:
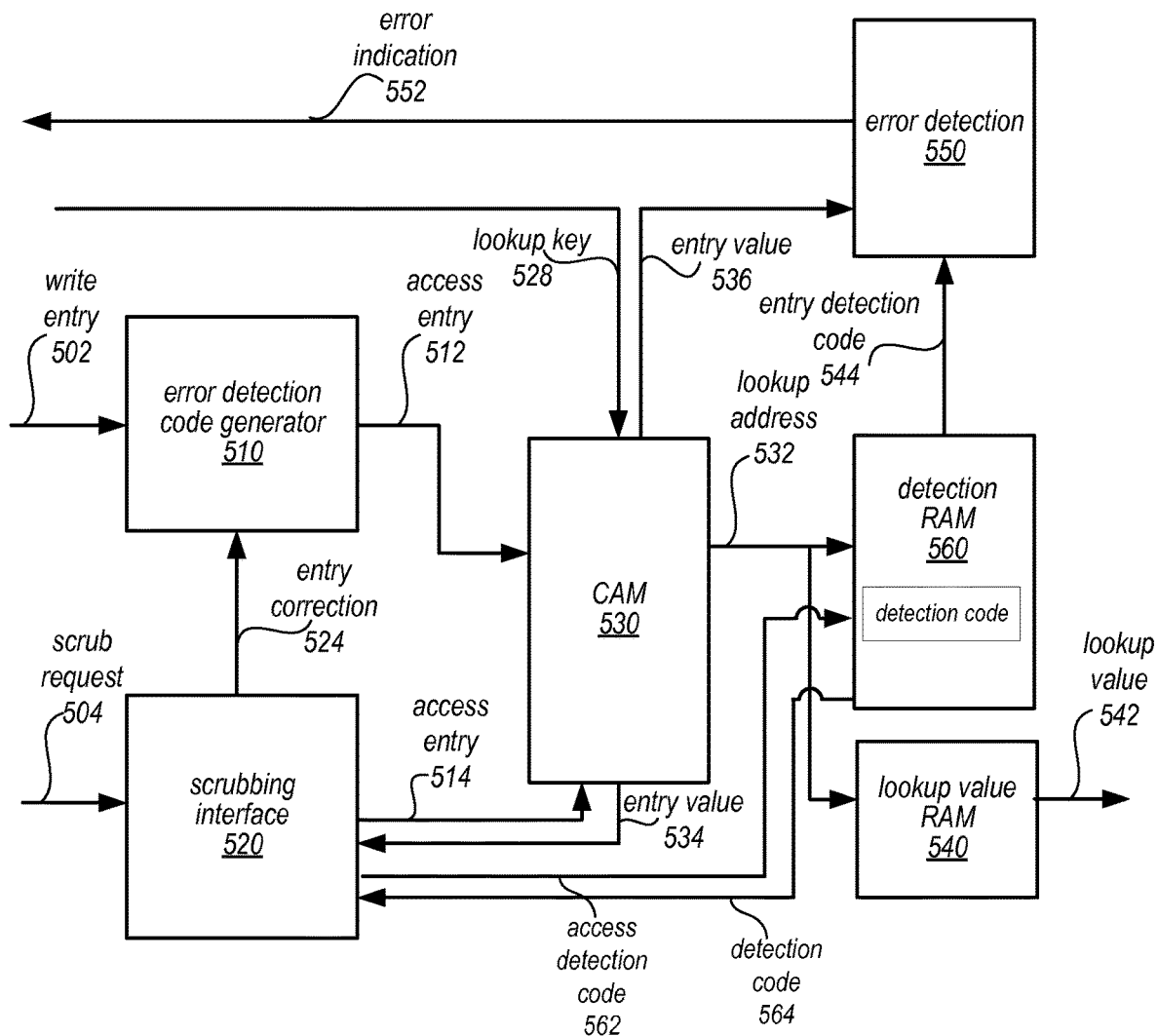

FIG. 5B is a logical block diagram of memory protection that utilizes memory protection data stored external to a CAM in a manner similar to FIG. 5A. However FIG. 5B illustrates an implementation that utilizes a different storage arrangement for memory protection data. As illustrated in FIG. 5B, the error detection code is maintained in detection RAM 560, which like lookup value RAM 540 may be one of different types of RAM devices. Scrubbing interface 520 may access the detection code 562 in detection RAM 560 (instead of lookup value RAM 540) to obtain the detection code 564 in order to perform validation. Likewise an identified match for a lookup key 528, may result in lookup address 532 being utilized to retrieve the entry error detection code for error detection 550. By utilizing separate RAMs, the CAM 530 may be implemented as part of a multi-stage lookup operation, sending a lookup address 532 to other CAMS (not illustrated) before finally reaching a lookup value for the lookup key 528. Detection RAM 560 may be used to identify an error in the value in CAM 530 so that further lookup operations in other CAMs are prevented.

Figure 6A:
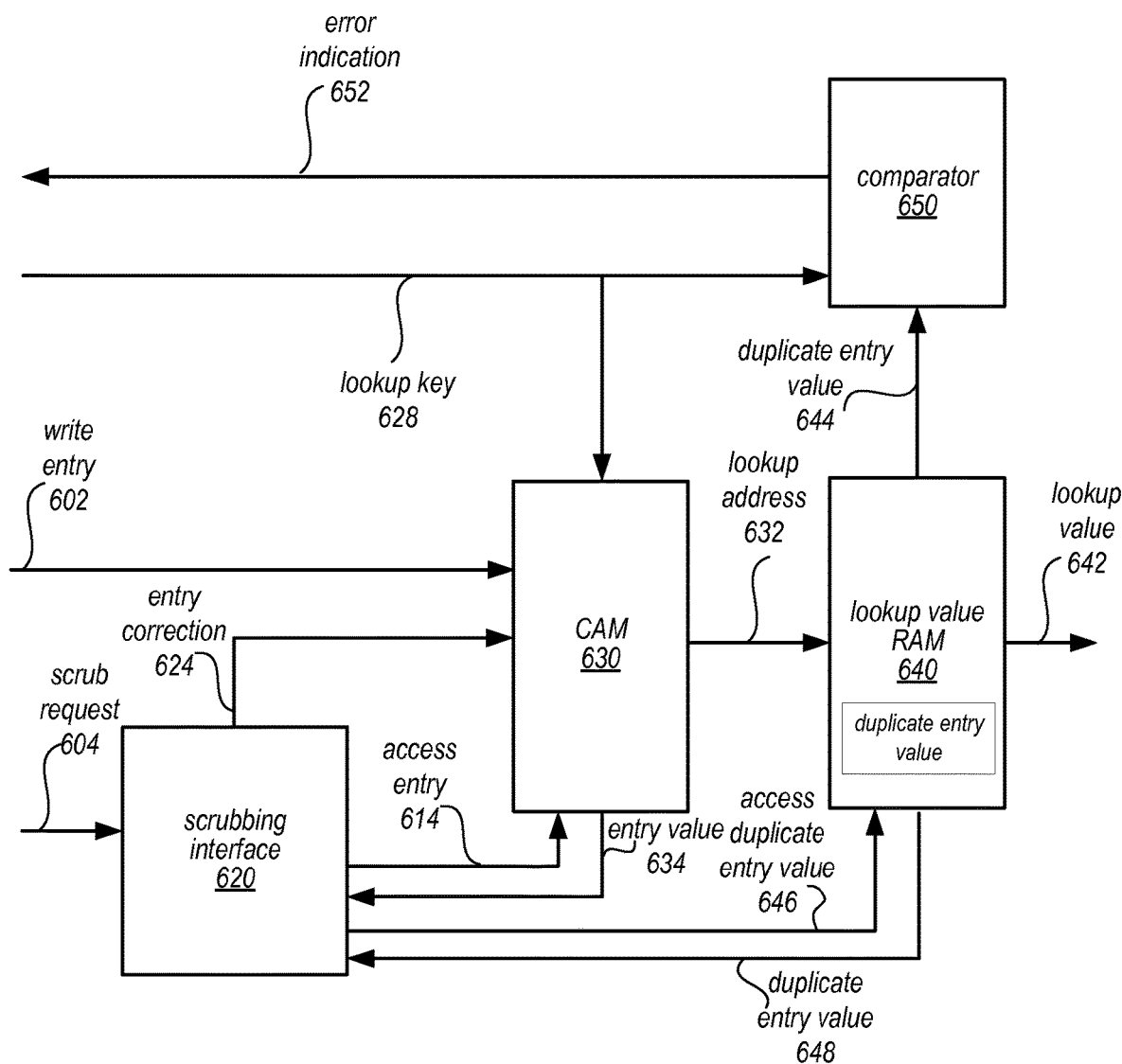

FIG. 6A illustrates another example of a logical block diagram of memory protection that utilizes memory protection data stored external to a CAM. In FIG. 6A, no error detection codes are maintained. Instead, a duplicate entry value is maintained in lookup RAM 640. Similar to the discussion above, a write entry 602 may be performed and a duplicate value of the entry written to lookup value RAM 640 as memory protection data. In FIG. 6A, two types of operations may trigger validation of an entry stored in CAM 630. Scrubbing interface 620, for instance, may receive a scrub request 604 for an entry in CAM 630. Scrubbing interface 620 may access 614 CAM 630 to obtain the entry value 634. Scrubbing interface 620 may also access duplicate entry value 646 in lookup RAM 640 to obtain the duplicate entry value 648. Scrubbing interface 620 may compare the duplicate entry value with the entry value obtained at 634 to determine the existence of bit errors. If the two values match, then no bit errors may occur. However, if the values do not match then scrubbing interface 620 may perform an entry correction 624 to rewrite the entry with the corrected data (and may include generating an updated duplicate entry value). Although not illustrated, in some embodiments, a multiplexer or other selection component may be implemented to provide access to CAM 630 by allowing write entry 602 or entry correction 624 to be written to the entry in CAM 630. In some embodiments, scrubbing interface 620 may access a backup copy of the entry to provide the entry correction 624. In at least some embodiments, scrubbing interface 620 may provide an error indication, instead of entry correction. The error indication may be provided so that a CPU or other controller may initiate a correction of the erroneous entry via a write 602 to the entry.

The other operation that may trigger the validation of an entry in CAM 630 is a lookup operation. For example, a lookup key 628 may be received to perform a lookup operation. A matching entry in CAM 630 may be identified and a corresponding lookup address 632 utilized to read and provide the lookup value 642 stored in lookup value RAM 640. The duplicate entry value may also be obtained and provided 644 to comparator 650. Comparator 650 may be implemented to compare the duplicate entry value with the lookup key 628. If the lookup key 628 and duplicate entry 644 match, then no error may be detected. However, if the lookup key 628 and the duplicate entry 644 do not match, then an error indication 652 may be provided. As discussed above, control software, such as firmware, an operating system, or other software controller may handle the error (e.g., by determining and providing a corrected entry to write 602 to CAM 630). Because error detection is performed by comparing two values (e.g., a low complexity solution that utilizes a bitwise comparison), error detection may be achieved with very high performance. As also discussed above, error indication 652 may also be provided so that further processing may be halted, restarted, or otherwise adapted instead of utilizing an erroneous result provided by CAM 630.

Figure 6B:
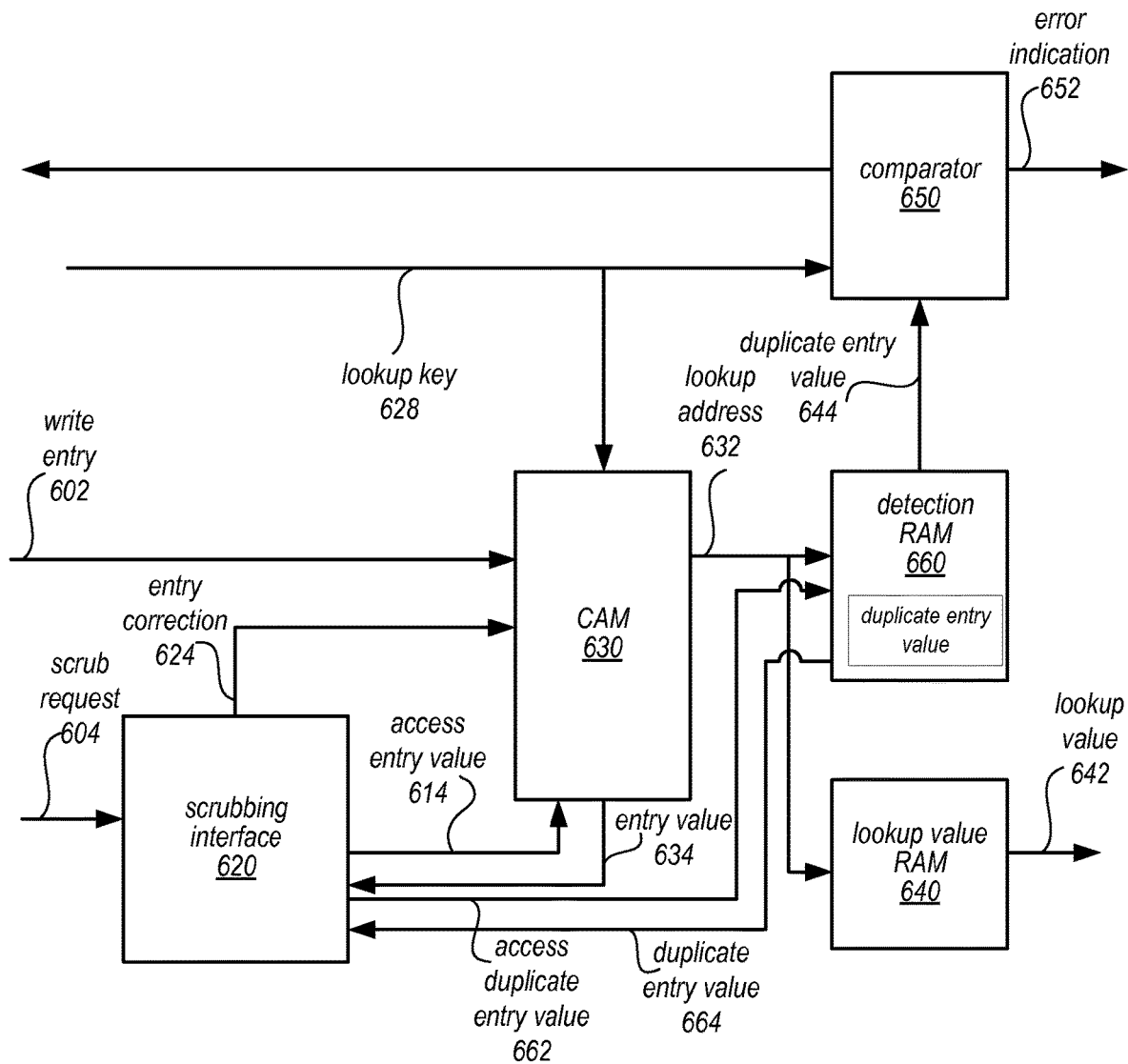

FIG. 6B is a logical block diagram of memory protection that utilizes memory protection data stored external to a CAM in a manner similar to FIG. 6A. However FIG. 6B illustrates an implementation that utilizes a different storage arrangement for memory protection data. As illustrated in FIG. 6B, the duplicate entry value is maintained in detection RAM 660, which like lookup value RAM 640 may be one of different types of RAM devices. Scrubbing interface 620 may access 662 detection RAM 660 (instead of lookup value RAM 640) to obtain the duplicate entry value 664 to perform validation. Likewise an identified match for a lookup key 628, may result in lookup address 632 being utilized to retrieve the duplicate entry value for comparator 650. By utilizing separate RAMs, the CAM 630 may be implemented as part of a multi-stage lookup operation, sending a lookup address 632 to other CAMS (not illustrated) before finally reaching a lookup value for the lookup key 628. Detection RAM 660 may be used to identify an error in the value in CAM 630 so that further lookup operations in other CAMs are prevented.

Figure 7:
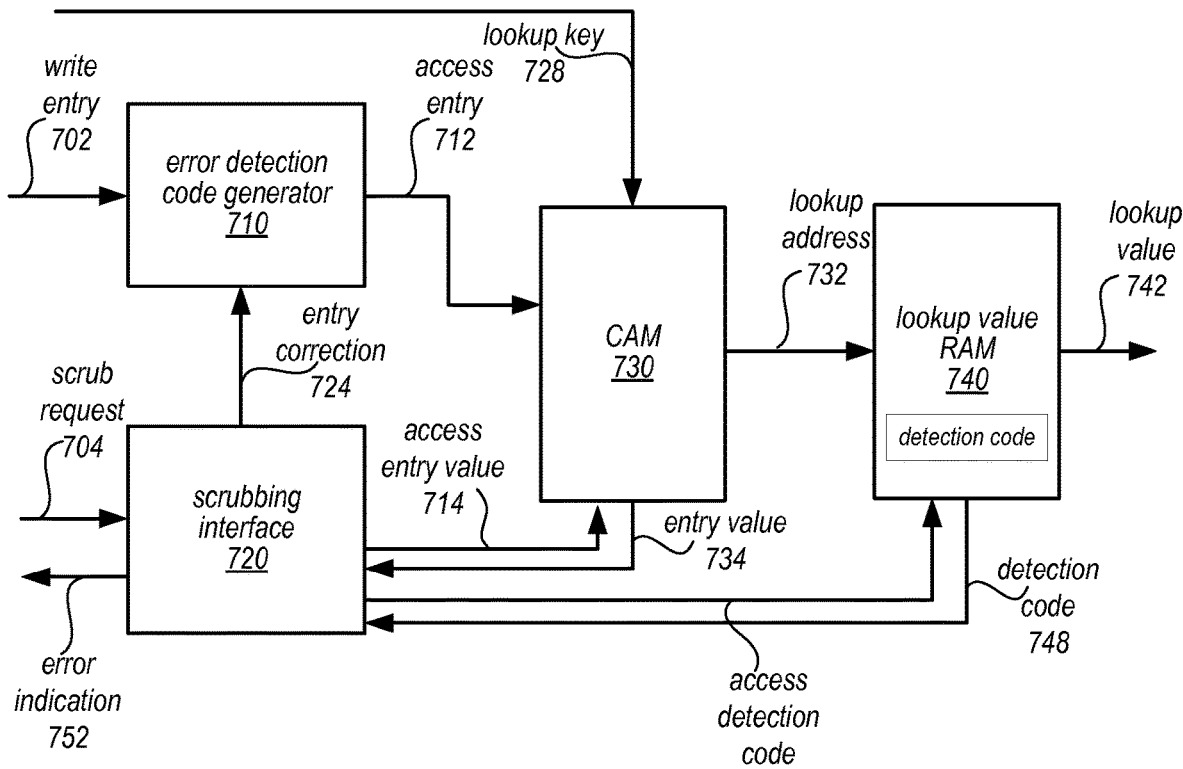

FIG. 7 is another example logical block diagram of memory protection that utilizes memory protection data stored external to a CAM. In FIG. 7, a write to an entry 702 may trigger the generation of an error detection code by error detection code generator 710. Error detection code generator 710, like error detection code generators discussed above in FIGS. 5A and 5B, may receive as input data bits which may be directly used as input or evaluated, manipulated, modified, or used to derive other data bits which may be used to generate an error detection code (e.g., according to the various techniques to generate error detection codes discussed below, such as parity bits and error correction codes). Error detection code generator 710 may then store the value 712 into the entry in CAM 530 and the generated error detection code in lookup value RAM 740. Lookup value RAM 740 may be implemented as one of different types of RAM, such as static RAM or dynamic RAM, and store the lookup values corresponding to entries in CAM 730.

In FIG. 7, one type of operation may trigger validation of an entry stored in CAM 730. Scrubbing interface 720, for instance, may receive a scrub request 704 for an entry in CAM 730. Scrubbing interface 720 may access 714 CAM 730 to obtain the entry value 734. Scrubbing interface 720 may also access 746 lookup value RAM 740 to obtain the error detection code 748. Scrubbing interface 720 may utilize the error detection code to determine whether the entry value obtained at 734 is valid. Similar to the discussion above, if the error detection code is a parity bit, then scrubbing interface 720 may perform a parity check utilizing the parity bit to determine whether a bit error exists. Likewise if the error detection code is an error correction code, then scrubbing interface 720 may decode the error correction code with respect to the entry value to generate a syndrome code, which may indicate whether bit errors exist in the value of the entry. In some embodiments, scrubbing interface 720 may generate an entry correction 724 to be passed to error detection code generator 710 which may utilize the entry correction code to rewrite the entry with the corrected data (and may include generating an update error detection code). In some embodiments, scrubbing interface 720 may access a backup copy of the entry to provide the entry correction 724. Scrubbing interface 720 may provide an error indication, in some embodiments, which may be utilized by control software, such as firmware, an operating system, or other software controller to handle the error (e.g., by determining and providing a corrected entry to write 702 to CAM 730). As validation of entries in CAM 730 is performed only by scrubbing interface 720 utilizing low hardware complexity, the embodiment illustrated in FIG. 7 may be optimal for devices with small power and space budgets (e.g., low power devices).

Figure 8A:
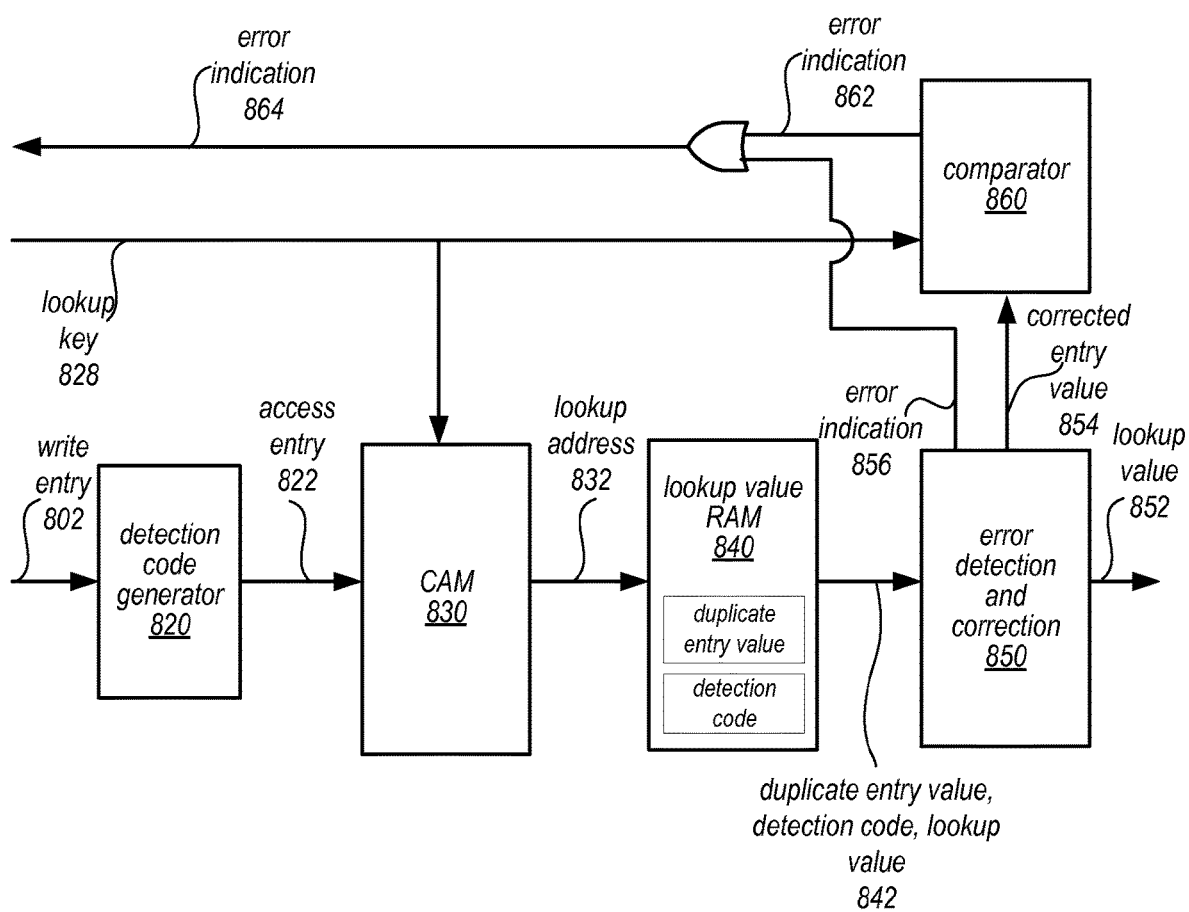

FIG. 8A illustrates another example of a logical block diagram of memory protection that utilizes memory protection data stored external to a CAM. In FIG. 8A, both error detection codes and duplicate entry values are maintained in lookup RAM 640. Similar to the discussion above, a write entry 802 may be performed and a duplicate value of the entry written to lookup value RAM 840 as memory protection data. Write to an entry 802 may also trigger the generation of an error detection code by error detection code generator 810. Error detection code generator 810 receive as input data bits which may be directly used as input or evaluated, manipulated, modified, or used to derive other data bits which may be used to generate an error detection code (e.g., according to the various techniques to generate error detection codes discussed below, such as parity bits and error correction codes). Error detection code generator 810 may then store 812 the value into the entry in CAM 830 and the generated error detection code in lookup value RAM 840. Lookup value RAM 840 may be implemented as one of different types of RAM, such as static RAM or dynamic RAM, and store the lookup values corresponding to entries in CAM 830.

In FIG. 8A, one type of operation may trigger validation of an entry stored in CAM 630, a lookup operation. For example, a lookup key 828 may be received to perform a lookup operation. A matching entry in CAM 830 may be identified and a corresponding lookup address 832 utilized to read and provide the lookup value, duplicate entry value, and detection code 842 stored in lookup value RAM 840 to error detection and correction 850. Error detection and correction 850 may utilize the detection code and the duplicate entry value to determine whether the duplicate entry value obtained at 842 is valid. Similar to the discussion above, if the error detection code is a parity bit, then error detection and correction 850 perform a parity check on the duplicate entry value utilizing the parity bit to determine whether a bit error exists in the duplicate entry value. Likewise if the error detection code is an error correction code, then error detection and correction 850 may decode the error correction code with respect to the duplicate entry value to generate a syndrome code, which may indicate whether bit errors exist in the duplicate value of the entry. In some embodiments, error detection and correction 850 may identify and correct detected bit errors in the duplicate entry value. For example, in the scenario where CAM 830 is a TCAM, data, mask, and valid bit errors may be detected and corrected. If an uncorrectable error is detected, then an error indication may be provided 856. The corrected duplicate entry value 854 may also be provided to comparator 860 which may compare the corrected entry value to lookup key 828 (e.g., via a bitwise comparison of the two values). If the two values do not match, then it may be determined that a false hit has taken place and an error indication 862 provided. Note that in some embodiments a logical operator, such as an "OR" operator illustrated in FIG. 8A may ensure that either error indication 856 or 862 is provided as an error indication 864. In this way, further processing may be halted, restarted, or otherwise adapted instead of utilizing an erroneous result provided by CAM 830 because lookup value 852 may be known to be erroneous. The embodiment described in FIG. 8A may provide a low software complexity solution (as false hits are detected in hardware) that is optimal in implementations with less processing capacity.

Figure 8B:
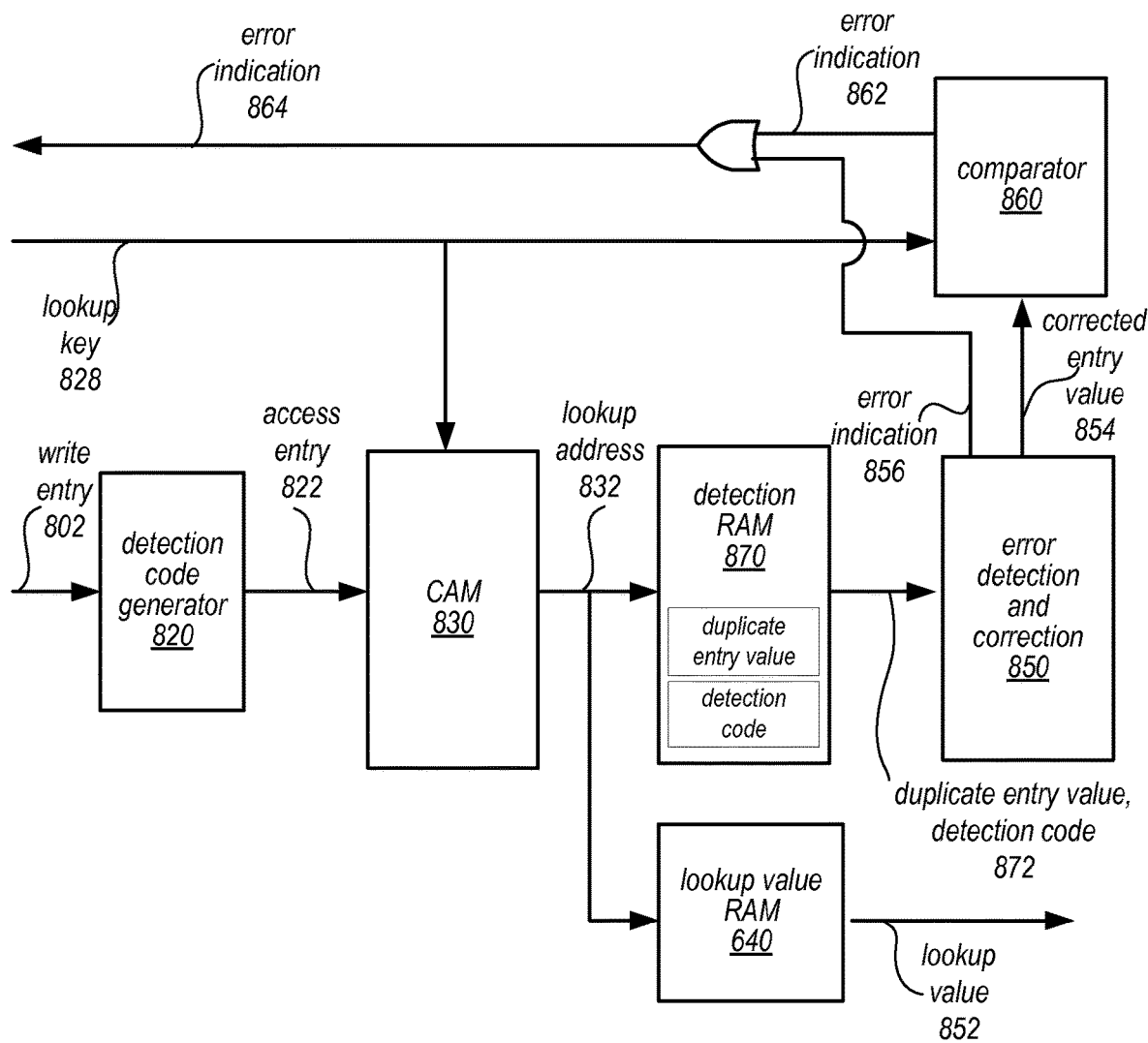

FIG. 8B is a logical block diagram of memory protection that utilizes memory protection data stored external to a CAM in a manner similar to FIG. 8A. However FIG. 8B illustrates an implementation that utilizes a different storage arrangement for memory protection data. As illustrated in FIG. 8B, the error detection code and duplicate entry value are maintained in detection RAM 860, which like lookup value RAM 840 may be one of different types of RAM devices. Error detection and correction 850 may utilize the detection code and the duplicate entry value to determine whether the duplicate entry value obtained at 842 is valid. Likewise an identified match for a lookup key 828, may result in lookup address 832 being utilized to retrieve the error detection code and duplicate entry value for error detection and correction 850. By utilizing separate RAMs, the CAM 830 may be implemented as part of a multi-stage lookup operation, sending a lookup address 832 to other CAMS (not illustrated) before finally reaching a lookup value for the lookup key 828. Detection RAM 860 may be used to identify an error in the value in CAM 830 so that further lookup operations in other CAMs are prevented.

Figure 9A:
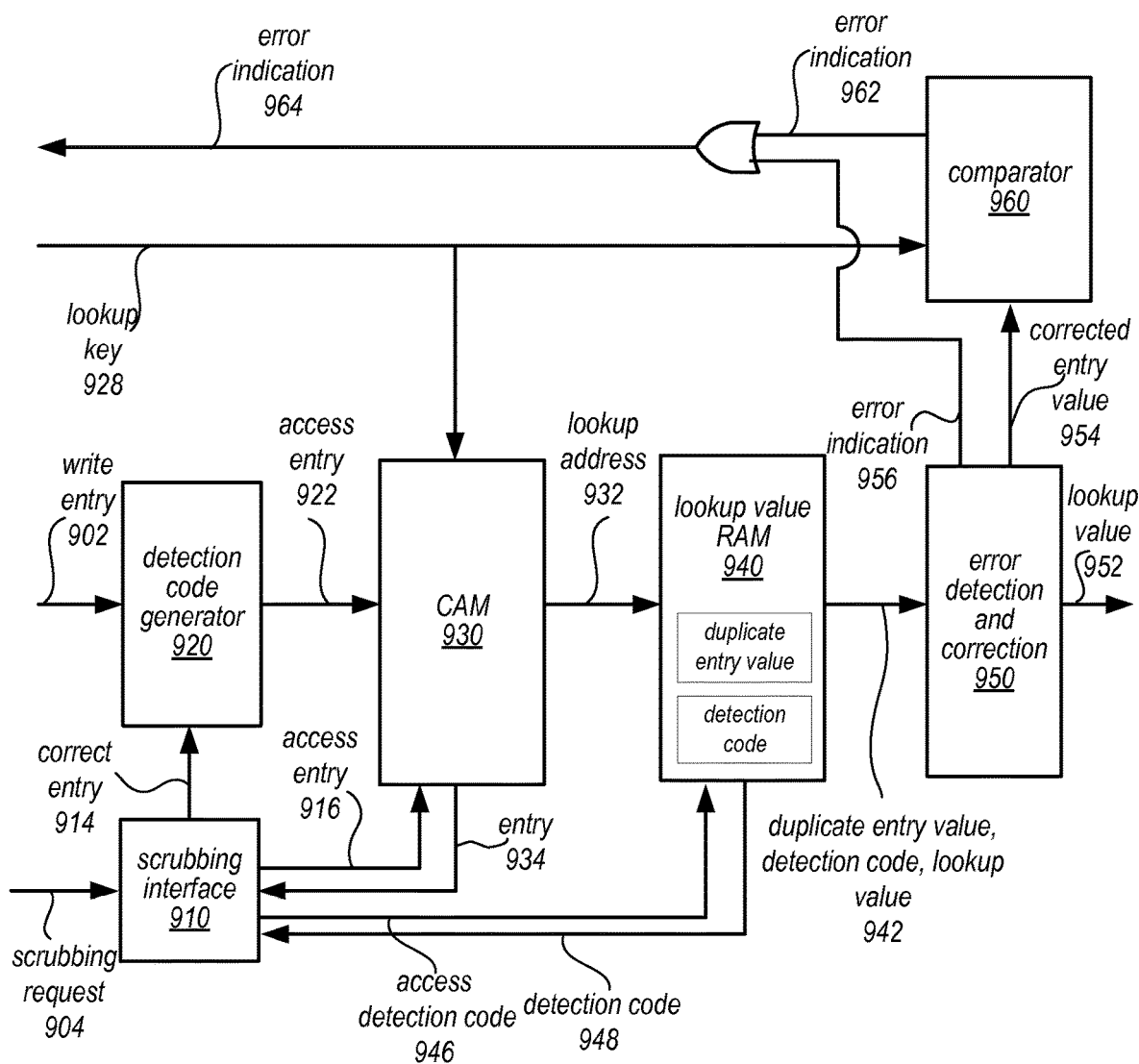

FIG. 9A illustrates another example of a logical block diagram of memory protection that utilizes memory protection data stored external to a CAM. In FIG. 9A, both error detection codes and duplicate entry values are maintained in lookup RAM 940. Similar to the discussion above, a write entry 902 may be performed and a duplicate value of the entry written to lookup value RAM 940 as memory protection data. Write to an entry 902 may also trigger the generation of an error detection code by error detection code generator 910. Error detection code generator 910 may receive as input data bits which may be directly used as input or evaluated, manipulated, modified, or used to derive other data bits which may be used to generate an error detection code (e.g., according to the various techniques to generate error detection codes discussed below, such as parity bits and error correction codes). Error detection code generator 910 may then store 922 the value into the entry in CAM 930 and the generated error detection code in lookup value RAM 940. Lookup value RAM 940 may be implemented as one of different types of RAM, such as static RAM or dynamic RAM, and store the lookup values corresponding to entries in CAM 930.

In FIG. 9A, two types of operations may trigger validation of an entry stored in CAM 930. Scrubbing interface 910, for instance, may receive a scrub request 604 for an entry in CAM 630. Scrubbing interface 910 may access 916 CAM 930 to obtain the entry value 934. Scrubbing interface 910 may also access 946 detection RAM 940 obtain the duplicate entry value and error detection code 948. Scrubbing interface 910 may perform various techniques to detect and correct errors, such as utilizing the error detection code to determine whether the entry value obtained at 934 is valid. Similar to the discussion above, if the error detection code is a parity bit, then scrubbing interface 910 may perform a parity check utilizing the parity bit to determine whether a bit error exists. Likewise if the error detection code is an error correction code, then scrubbing interface 910 may decode the error correction code with respect to the entry value to generate a syndrome code, which may indicate whether bit errors exist in the value of the entry. In some embodiments, scrubbing interface 910 may generate an entry correction 914 to be passed to error detection code generator 920 which may utilize the entry correction code to rewrite the entry with the corrected data (and may include generating an update error detection code). In some embodiments, scrubbing interface 910 may access a backup copy of the entry to provide the entry correction 914.

Another operation that may trigger validation of the entry is a lookup operation. For example, a lookup key 928 may be received to perform a lookup operation. A matching entry in CAM 930 may be identified and a corresponding lookup address 932 utilized to read and provide the lookup value, duplicate entry value, and detection code 942 stored in lookup value RAM 940 to error detection and correction 950. Error detection and correction 950 may utilize the detection code and the duplicate entry value to determine whether the duplicate entry value obtained at 942 is valid. Similar to the discussion above, if the error detection code is a parity bit, then error detection and correction 950 may perform a parity check on the duplicate entry value utilizing the parity bit to determine whether a bit error exists in the duplicate entry value. Likewise if the error detection code is an error correction code, then error detection and correction 950 may decode the error correction code with respect to the duplicate entry value to generate a syndrome code, which may indicate whether bit errors exist in the duplicate value of the entry. In some embodiments, error detection and correction 950 may identify and correct detected bit errors in the duplicate entry value. If an uncorrectable error is detected, then an error indication may be provided 956. The corrected duplicate entry value 954 may be provided to comparator 960 which may compare the corrected entry value to lookup key 928 (e.g., via a bitwise comparison of the two values). If the two values do not match, then it may be determined that a false hit has taken place and an error indication 962 provided. Note that in some embodiments a logical operator, such as an "OR" operator illustrated in FIG. 9A may ensure that either error indication 956 or 962 is provided as an error indication 964. In this way, further processing may be halted, restarted, or otherwise adapted instead of utilizing an erroneous result provided by CAM 930 because lookup value 952 may be known to be erroneous. The embodiment described in FIG. 9A may provide a greater tolerance of high bit error rates as result of both scrubbing operations and post-lookup error detection operations. For instance, scenarios where cost efficient, robust error protection is desired may implement the embodiment in FIG. 9A and still provide a low latency lookup operation response.

Figure 9B:
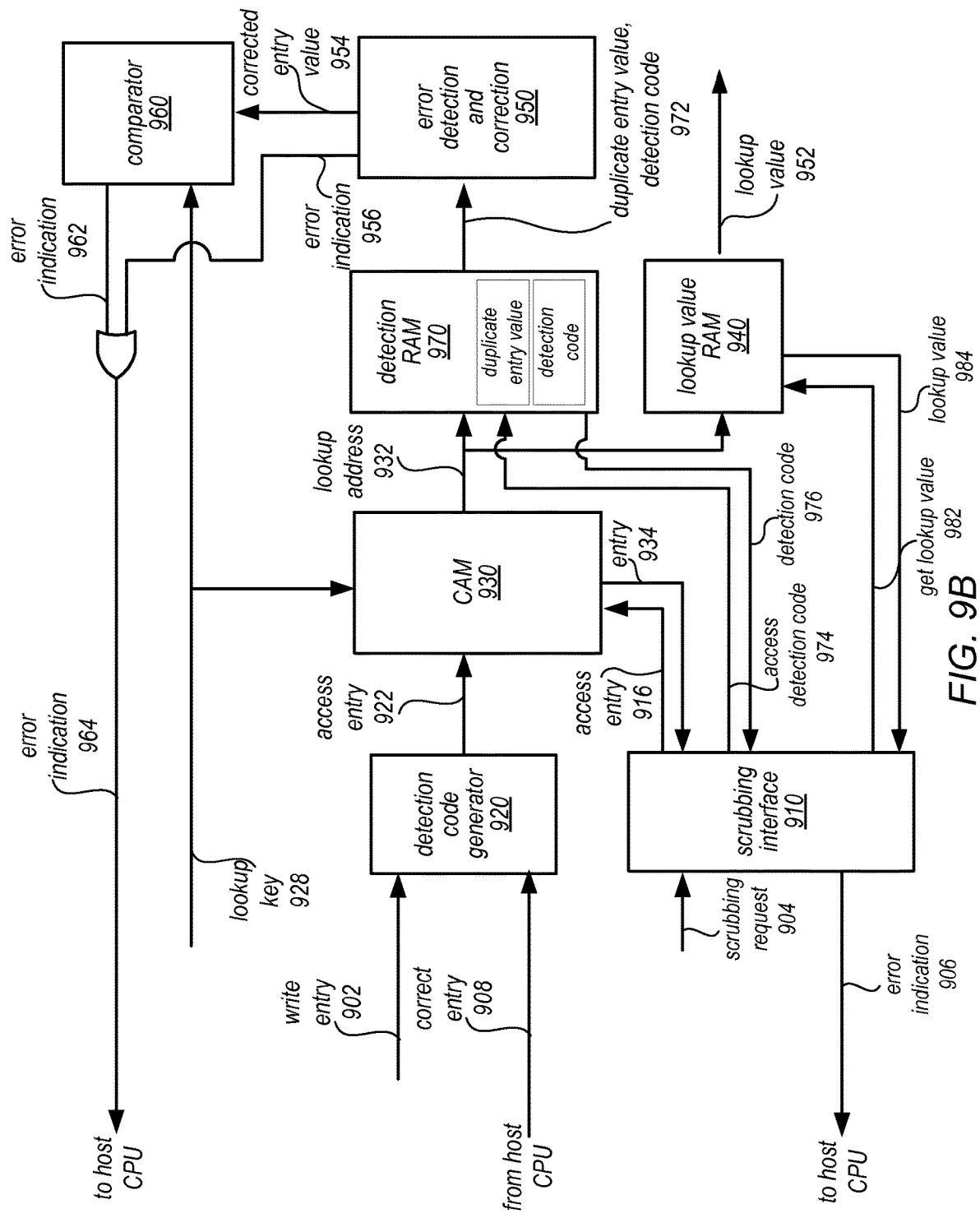

FIG. 9B is a logical block diagram of memory protection that utilizes memory protection data stored external to a CAM in a manner similar to FIG. 9A. However FIG. 9B illustrates an implementation that utilizes a different storage arrangement for memory protection data. As illustrated in FIG. 9B, the error detection code and duplicate entry value are maintained in detection RAM 960, which like lookup value RAM 940 may be one of different types of RAM devices. Error detection and correction 950 may utilize the detection code and the duplicate entry value to determine whether the duplicate entry value obtained at 972 is valid. An identified match for a lookup key 928, may result in lookup address 932 being utilized to retrieve the error detection code and duplicate entry value 972 in detection RAM 970 for error detection and correction 950. By utilizing separate RAMs, the CAM 930 may be implemented as part of a multi-stage lookup operation, sending a lookup address 932 to other CAMS (not illustrated) before finally reaching a lookup value for the lookup key 928. Detection RAM 970 may be used to identify an error in the value in CAM 930 so that further lookup operations in other CAMs are prevented.

FIG. 9B also illustrates that, in some embodiments, correction of detected errors in CAM 930, detection RAM 970, or lookup value RAM 940 may be performed in response to providing error indications, such as indications 964 and 906, to a host CPU (or some other controller). For example, a scrubbing request 904 may trigger scrubbing operations for CAM 930 (e.g., accessing 916 and returning 934 an entry), detection RAM 970 (e.g., accessing 974 and returning 976 duplicate entry value and detection code), and lookup value RAM 940 (e.g., accessing 982 and returning 984 a lookup value). If an error is detected, error indication 906 may provide an indication to a host CPU so that the host CPU may initiate an action to correct the error, such as entry correction 908 for CAM 930. Additionally, error indications may also be provided to halt further processing. For example, error indication 964 may be provided to the host CPU so that the host CPU may stop further processing that utilizes lookup value 952.

Please note that the examples discussed above with regard to FIGS. 5A-9B may be implemented in dedicated hardware to perform the various operations described above. For example, the various components illustrated may be implemented as part of an application specific integrated circuit (ASIC), field programmable gate array (FPGA), or other integrated circuitry that implements a CAM for which memory protection may be implemented.

Figure 10:
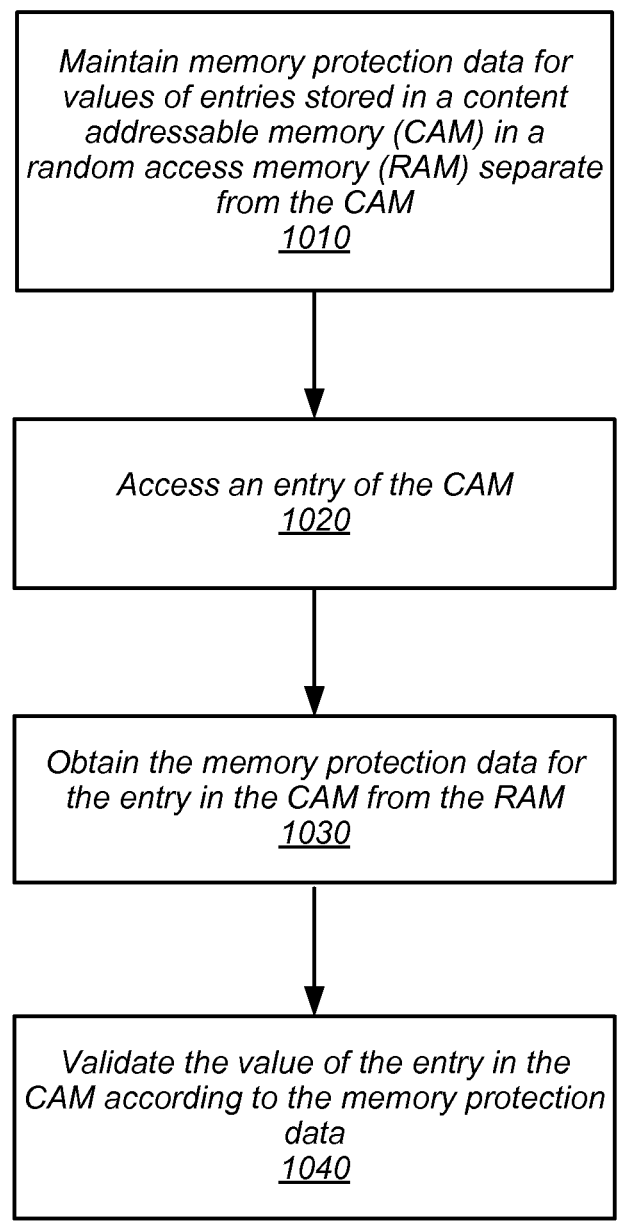
FIG. 10 is a high-level flowchart illustrating various methods and techniques to implement external memory protection for content addressable memory, according to some embodiments.

FIGS. 2-4 provide an example of a networking device that implements a packet processor which may implement a CAM and provide memory protection utilizing externally maintained memory protection data. FIGS. 5A-9B provide further examples of different configurations of memory protection that utilize externally maintained memory protection data with respect to a CAM. However, numerous other types or configurations of CAMs or hardware implementing CAMs, such as other packet processors or circuitry for switches, routers, network bricks, or other networking devices, may provide external memory protection for CAMs. FIG. 10 is a high-level flowchart illustrating various methods and techniques to implement external memory protection for content addressable memory, according to some embodiments. The various components described above may implement these techniques (in addition to those described with regard to FIG. 11 below) as well as various other integrated circuits that implement CAMs.

As indicated at 1010, memory protection data may be maintained for values of entries stored in a content addressable memory (CAM) in a random access memory (RAM) separate from the CAM. For example, the RAM may be implemented to store lookup values (e.g., action values) for lookup operations performed at the CAM. The memory protection data for an entry may be stored in a location along with the lookup value corresponding to the entry. Alternatively, separate or dedicated RAM may be implemented to store memory protection data for the entries of the CAM. The memory protection data may be stored in locations that correspond to the different entries of the CAM (e.g., by storing the memory protection data at the lookup address in the RAM for the entry). As the memory protection data is stored in a RAM separate from the CAM, various benefits accrue. For example, other memory protection mechanisms may be implemented for the RAM, ensuring the validity of the memory protection data. Thus when the memory protection data is utilized to validate an entry in the CAM, the memory protection data may be relied upon. Another benefit provided by the separation of memory protection data is that lookups to a CAM may be pipelined with error detection of CAM entries so that detection of erroneous entry may occur simultaneously with determining a lookup value. In this way, further processing based on a lookup value may be halted if based on an erroneous CAM entry value. Please note that different types of CAM and RAM may be implemented. Binary CAM or ternary CAM may be implemented, for instance, as well as static RAM or dynamic RAM, to perform the techniques described below.

As indicated at 1020, an entry of the CAM may be accessed. Such an access may be performed as part of a lookup operation, in some embodiments. For example, a lookup key may be received at the CAM. The bit values of the lookup key may be compared with the respective bit values of the values in the entries of the CAM. Matching entries may be identified where the bit values of the lookup key match the bit values of the entry value (except where the entry indicates a don't-care condition in which case either a 1 or a 0 in the lookup key is considered a match for TCAM implementations of the CAM). An identified entry that matches the lookup key may be the accessed entry. Thus, the validation operation performed in response to a lookup operation may be referred to as a post-lookup validation. In at least some embodiments, multi-stage lookup operations may be performed. Consider an example where multiple CAMs may be implemented to reduce the number of lookup operations performed. A first lookup operation may be performed with respect to a subset of entries (e.g., out of a total number of entries stored across the staged CAMs). If no match is identified, then lookup operations need not be performed at later stage CAMs. If a match is identified, then further lookup operations may be performed at one or more later staged CAMs.

In some embodiments, the entry of the CAM may be accessed as part of a scrubbing operation. For example, CAM entries may be periodically accessed to trigger performance of error detection and/or correction techniques. In this way, correctable errors in the values of the entries may be corrected to reduce the occurrence of false hits (when an invalid value of an entry erroneously matches a lookup key) and false misses (when an invalid value of an entry doesn't match a lookup key that it would have matched but for bit error). Bit errors in the valid bit may also be corrected to prevent entries from being ignored when actually valid, and to prevent entries that should not be considered from evaluation.

In response to the access of the entry, the memory protection data for the entry may be obtained from the CAM, as indicated at 1030, in various embodiments. For instance, a lookup address corresponding to the entry in the CAM may be utilized to locate the memory protection data in the RAM. As indicated at 1040, the value of the entry in the CAM may be validated according to the memory protection data. Validation of the value may determine whether bit errors exist in the value of the entry (e.g., bit errors in data bits, mask bits, valid bits, or any other bits stored in the entry or for the entry). Different validation techniques or combinations of validation techniques may be implemented, which may be dependent on the various types of memory protection data stored for the entry and/or the operation triggering the validation (e.g., post-lookup or scrubbing). For example, error detection codes (e.g., in FIGS. 5A, 5B, 7, 8A, 8B, 9A, and 9B) may be stored in the memory protection data, which may be decoded, evaluated, processed, or otherwise utilized to determine the existence of bit errors. Consider a parity bit stored in the memory protection data. The parity bit may be used to perform a parity check by recalculating the value for the parity bit based on current bits stored in the entry. The recalculated value may be compared with the parity bit and if the bits are not the same, then it may be determined that one or multiple bit flips have occurred in the value for the entry. Other error detection codes, such as different types of error correction codes may also be implemented. For example, a single error correction double error detection (SECDED) error correction code may be stored in memory protection data. The SECDED error correction code may be decoded to generate a syndrome code which may identify a number of bit errors and/or particular bits that have flipped. Duplicate values of the entry stored in memory protection data may also be utilized. For instance, the value of a lookup key or current value of the entry in the CAM may be compared with a duplicate value to determine whether the values match.

Different combinations validation techniques performed in response to different operations may detect different errors. As noted in the examples discussed above with regard to FIGS. 5A-9B, scrubbing, post-lookup, separate storage for memory protection data, and/or different types of memory protection data generated and maintained may result in the detection and/or correction of different bit errors. For example, different single bit errors may be detected in response to a scrubbing operation based on a parity bit value and duplicate value stored in memory protection data (e.g., bit errors in a TCAM entry that change a data bit, mask bit pair of 0,0 to 0,1 or to 1,0), whereas a post lookup operation may only detect the single bit errors if the false match occurred at an erroneous entry.

In some embodiments, error correction may be performed. Corrected values (e.g., a correction mask) may be provided to a write interface for the erroneous entry to rewrite the corrected value and/or to another error detection component, such as a comparator component, as illustrated in FIGS. 9A and 9B. The errors corrected may be dependent upon the operations, storage arrangements for memory protection data, and/or types of memory protection data maintained, similar to the detection of errors. For instance, as some double bit flip errors may be corrected for TCAM entries that maintain a certain type of SECDED error correction code.

Please note that validation of the value may also include any other information known about or derived for the value. Consider entries stored in a TCAM. As noted above, memory cells in TCAM may be set to an illegal state (e.g., data bit=1, mask bit=1). As illegal states may always indicate an error, the identification of memory cells with illegal states may be used in combination with memory protection data for error detection and/or correction. For example, an illegal state identified for a memory cell may be corrected based on an indication determined from an error correction code in the memory protection data that the memory cell was supposed to store a don't care state (e.g., data bit=0, mask bit=0) because the error correction code was generated from bits indicating the presence or absence of don't care states for the memory cells of the TCAM entry.

Figure 11:
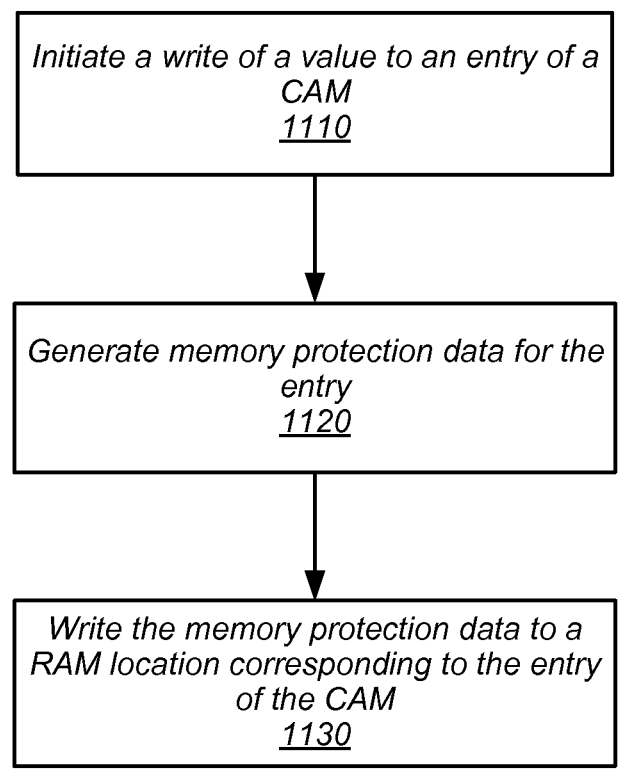
FIG. 11 is a high-level flowchart illustrating various methods and techniques for generating memory protection data for entries in a CAM, according to some embodiments.

FIG. 11 is a high-level flowchart illustrating various methods and techniques for generating memory protection data for entries in a CAM, according to some embodiments. As indicated at 1110, a write to a value of an entry of a CAM may be initiated. For example, the write may be initiated to store a new value or new entry in the CAM or the write may be initiated to update a portion of the entry (e.g., changing a valid bit for the entry from valid to invalid, or invalid to valid). In some embodiments, the write may be initiated as part of an error correction identified by a previous validation of the entry, as discussed above.

As indicated at 1120, memory protection data may be generated for the entry, in various embodiments. For instance, an error correction code generator that takes as input data, such as different bits to be stored in the value of the entry (e.g., data bits, mask bits, a valid bit), bits derived from the bits to be stored in the entry (e.g., bits that indicate whether a don't care state is present in a TCAM memory cell), or some combination of the two types of input data may be used to perform the various calculations to generate a particular type of error correction code (e.g., a Hamming code or an extended Hamming code to provide single error correction double error detection (SECDED) for input bits). For example, in at least some embodiments, a valid bit, parity bit (calculated for the data bit values of TCAM memory cells, and the bits that indicate whether a don't care state is present in a TCAM memory cell may be provided as input for generating an error correction. Other error detection codes, in addition to error correction codes, may be generated. For example, a parity bit may be determined based on the values of bits in the entry. Memory protection data may also include a duplicate of the value of the entry (which may include data bits, valid bits, mask bits, or any other bit values stored in an entry).

As indicated at 1130, the memory protection data for the entry may be written to a location in the RAM that corresponds to the entry of the CAM. For example, the memory protection data may be stored at a location indicated by a lookup address for the entry. The RAM storing the memory protection device may, as noted above, also store a lookup value for the entry of the CAM. Alternatively, the RAM may be a different component than the RAM storing lookup values for entries in the CAM. In either embodiments, the location of the memory protection data may correspond to the entry (e.g., be stored at the lookup address).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
   a plurality of physical network interfaces;
   a packet processor that processes packets received via the plurality of physical network interfaces;
   wherein the packet processor comprises a content addressable memory (CAM) that stores respective values in a plurality of entries and a random access memory (RAM);
   wherein the packet processor is configured to:
   for each entry of the plurality of entries stored in the CAM:
     generate memory protection data for the value of the entry;
     write the memory protection data into a location in the RAM that corresponds to the entry; and
     in response to a determination by the CAM that the value of the entry matches a lookup key:
       provide, by the CAM, a lookup address corresponding to the entry and the value of the entry;
       read the memory protection data from a location in the RAM that corresponds to the lookup address provided by the CAM; and
       validate the value of the entry provided by the CAM according to the memory protection data.

2. The system of claim 1, wherein the packet processor is further configured to:
for each entry of the plurality of entries stored in the CAM:
in response to a scrub operation for the entry:
read the memory protection data from the location in the RAM; and
validate the value of the entry according to the memory protection data.

3. The system of claim 1, wherein the RAM is static RAM (SRAM), wherein the packet processor further implements a different SRAM that stores lookup values corresponding to the plurality of entries.

4. The system of claim 1, wherein the memory protection data comprises at least one of a duplicate value of the value of the entry or an error detection code generated based, at least in part, on the value of the entry.

5. A method, comprising:
maintaining memory protection data for respective values of a plurality of entries stored in a content addressable memory (CAM), the memory protection data being maintained in a random access memory (RAM) separate from the CAM, wherein the CAM and the RAM are part of an integrated circuit;
accessing, by the integrated circuit, one of the entries in the CAM, wherein the access of the one entry is performed as part of a lookup performed by the CAM with respect to a lookup key that is received, wherein a value of the one entry matches the lookup key;
in response to accessing one of the entries in the CAM:
providing, by the CAM, a lookup address corresponding to the one entry and the value of the entry;
obtaining, by the integrated circuit, the memory protection data for the one entry in the CAM from a location in the RAM corresponding to the lookup address provided by the CAM; and
validating, by the integrated circuit, the value of the one entry provided by the CAM according to the memory protection data.

6. The method of claim 5, wherein the memory protection data comprises an error correction code generated based, at least in part, on the respective value of the one entry, and wherein validating the respective value of the entry comprises decoding the error correction code with respect to the respective value to detect the existence of bit errors in the respective value.

7. The method of claim 6, wherein the decoding of the error correction code detects the existence of a bit error in the respective value, and wherein the method further comprises correcting the detected bit error in the respective value stored in the entry.

8. The method of claim 5, wherein the memory protection data comprises a duplicate of the respective value, and wherein validating the respective value further comprises comparing the lookup key with the duplicate of the respective value.

9. The method of claim 5, wherein the lookup performed with respect to the lookup key comprises multiple lookup stages.

10. The method of claim 5, wherein the RAM storing the memory protection data also stores a lookup value returned for the one entry in response to a determination that the one entry is a valid match for a lookup key.

11. The method of claim 5, further comprising:
generating, by the integrated circuit, the memory protection data for respective values of the plurality of entries as the respective values are written to the plurality of entries in the CAM; and
writing, by the integrated circuit, the memory protection data to different locations in the RAM corresponding to the plurality of entries in the CAM.

12. The method of claim 5, wherein the CAM is a ternary CAM (TCAM), and wherein the integrated circuit is part of a networking device.

13. An integrated circuit, comprising:
a content addressable memory (CAM) that stores respective values in a plurality of entries; and
a random access memory (RAM);
wherein for each entry of the plurality of entries stored in the CAM, the integrated circuit is configured to:
generate memory protection data for the value of the entry;
store the memory protection data in a location in the RAM that corresponds to the entry; and
in response to an access to the entry performed as part of a lookup performed by the CAM with respect to a lookup key that is received, wherein a value of the entry matches the lookup key:
provide, by the CAM, a lookup address corresponding to the entry and the value of the entry;
obtain the memory protection data from a location in the RAM that corresponds to the lookup address provided by the CAM; and
validate the value of the entry provided by the CAM according to the memory protection data.

14. The integrated circuit of claim 13, wherein the memory protection data comprises a duplicate of the value stored in the entry of the CAM, and wherein to validate the value of the entry, the integrated circuit is configured to compare the lookup key or the value stored in the entry with the duplicate of the value to detect the existence of bit errors in the value stored in the entry.

15. The integrated circuit of claim 14, wherein the memory protection data further comprises an error correction code generated based, at least in part, on the respective value stored in the entry of the CAM, and wherein to validate the value of the entry, the integrated circuit is further configured to decode the error correction code with respect to the value of the entry to detect the existence of bit errors stored in the entry.

16. The integrated circuit of claim 13, wherein the memory protection data further comprises a parity bit calculated based, at least in part, on the respective value stored in the entry of the CAM, and wherein to validate the value of the entry, the integrated circuit is further configured to compare the parity bit with a new parity bit calculated upon access of the respective value stored in the entry of the CAM to detect the existence of bit errors stored in the entry.

17. The integrated circuit of claim 13, wherein the access to the entry is performed as part of a scrubbing operation for the CAM.

18. The integrated circuit of claim 13, wherein the integrated circuit further comprises another RAM that stores lookup values corresponding to the plurality of entries stored in the CAM.

19. The integrated circuit of claim 18, wherein the lookup performed with respect to the lookup key comprises multiple lookup stages.

20. The integrated circuit of claim 13, wherein the CAM is a ternary CAM (TCAM), wherein the RAM is a static RAM (SRAM), and wherein the integrated circuit is an application specific integrated circuit (ASIC).

* * * * *